United States Patent Office 3,388,552
Patented June 18, 1968

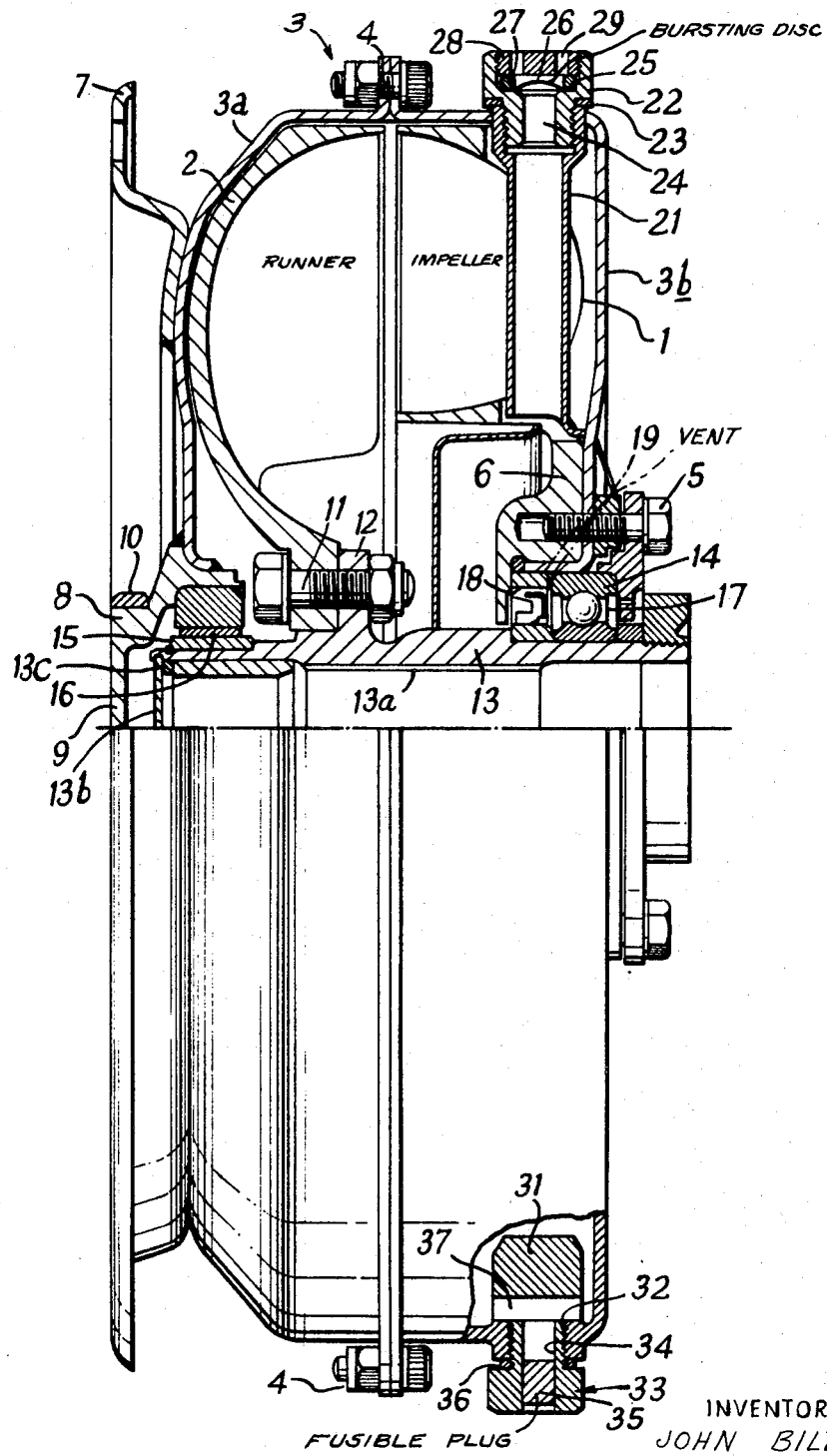

3,388,552
HYDRAULIC TURBO COUPLINGS
John Bilton, Middlesex, England, assignor to Fluidrive Engineering Company Limited, Middlesex, England
Filed Aug. 15, 1966, Ser. No. 572,447
Claims priority, application Great Britain, Aug. 16, 1965, 35,101/65
3 Claims. (Cl. 60—54)

ABSTRACT OF THE DISCLOSURE

A hydraulic turbo-coupling filled with water or a mixture of oil and water for use under hazardous conditions has a bursting disc arranged to rupture as a result of excessive pressure rise on overload and a further safety device of a different nature also arranged to yield on overload. The operator is provided with spares for the safety device intended to yield first. If this device is tampered with or otherwise thwarted, the coupling and driving motor are still protected against overload and attention is drawn to such tampering. The further safety devices may be a fusible plug which may melt either before or after the bursting disc had burst or it may be a fluid seal in the coupling.

---

The present invention relates to hydraulic turbo-couplings of the traction type, that is having a constant liquid filling, the liquid having a vapour pressure which increases significantly with increasing working temperature. Examples of such liquid are water and invert emulsions of for example 60% oil and 40% water.

In many applications, traction couplings are liable to run the risk of being overloaded, for example when the load driven through the coupling increases to such an extent that the torque transmitted by the coupling is insufficient to continue to drive the load. The output side of the coupling is then stalled and all the output power of the driving motor is dissipated as heat in the coupling.

According to the present invention there is provided a traction coupling employing as working liquid a liquid having a vapour pressure which increases significantly with increasing working temperature, the coupling being characterised in that it includes a bursting disc arranged to rupture when the internal pressure in the coupling exceeds a predetermined value and thereby to discharge the working liquid from the coupling. Preferably the dimensions of the bursting disc are such that, on rupture of the bursting disc, the liquid is discharged at such a rate that the temperature rise in the coupling is substantially halted.

Hitherto, oil has been generally used as the working liquid. The increase of the vapour pressure of the oils used with working temperature is insignificant and discharge of the working liquid on overload is effected by the melting of a fusible plug, the melting point of the plug being for example 280° F. To restore the coupling for normal use, the coupling must be re-filled and a new fusible plug fitted. It has been found in practice that such couplings may be abused, the discharge orifice in the fusible plug being blocked for example by a bolt so that the predetermined maximum working temperature of the coupling may be exceeded.

In order to reduce the possibilities of such abuse, a coupling in accordance with the present invention may include a further safety device such as a fusible plug arranged to discharge the working liquid when it reaches a second predetermined temperature which may be close to but either higher or lower than the temperature at which the pressure within the coupling causes rupture of the bursting disc. The operator of the equipment including the fluid coupling may then be given a supply of the safety devices having the lower operating temperature while the safety device having the higher operating temperature is made available only on request, the operator being required to explain the circumstances which cause the safety device having the higher operating temperature to discharge the working fluid.

For example, it is current practice for fusible plugs to be readily available in coal mines where oil-filled traction couplings are employed. The discharge of oil from such couplings on melting of the fusible plug presents a fire risk which may result in autogenous ignition of the oil. By using water or an invert emulsion of water and oil as working liquid, this fire risk is avoided. Fusible plugs would then still be available to the miner for replacement purposes and would therefore serve as the first or lowest temperature safety device, the bursting discs being less readily available. Couplings using liquids such as water having a high vapour pressure at high working temperatures require the use of at least one sealing gland between the relative rotating input and output parts of the coupling and this sealing gland may conveniently be arranged to rupture or yield at a pressure corresponding to a temperature somewhat above that of the first two safety devices, thereby still protecting the coupling even if both the first two safety devices have been tampered with and rendered inoperative.

An embodiment of the invention will now be described by way of example with reference to the accompanying drawing in which the upper part of the single figure is an axial sectional view of a water-filled traction coupling while the lower part is a side elevation with parts cut away.

The water-filled traction coupling shown in the drawing comprises vaned impeller and runner elements 1 and 2 which together define a working circuit for the coupling, the inner profile diameter of the impeller 1 being greater than that of the runner 2. A sheet metal impeller casing 3 consists of two portions 3a and 3b secured together by bolts 4 and extends around both the impeller and runner elements 1 and 2 and is secured by bolts 5 to the hub 6 of the impeller 1. Welded to the portion 3a of the impeller casing are a driving flange 7 and a locating hub 8. The locating hub 8 has an inner radially extending wall 9 which serves to retain the working liquid in the coupling. The impeller casing 3 is connected to the driving machine, for example an electric motor by means of the driving flange 7, being centered in a bore in the motor shaft by means of a part spherical surface 10 on the locating hub 8.

The runner 2 is secured by bolts 11 to a flange 12 on a hollow runner sleeve 13. The interior of the runner sleeve 13 is formed with a set of driving splanes 13a for connecting to the driven machine and its end nearest the driving hub 8 is closed by a disc 13b, the passage of liquid between the disc 13b and the runner sleeve 13 being prevented by a sealing ring 13c. The runner sleeve 13 is rotatably supported and located relative to the impeller casing 3 by a ball bearing 14 between the impeller hub 6 and the output end of the runner sleeve 13 and by a plain bearing 15 of the water lubricated type comprising for example a sleeve 16 of polytetrafluoroethylene. The ball bearing 14 is of the pre-packed type having lubricant retaining dust covers 17.

A sealing gland 18 of the type including resilient sealing lips is located between the impeller hub 6 and the output end of the runner sleeve 13 inboard of the ball bearing 14 and serves to prevent the escape of the working liquid, in this case water, between the relatively rotating parts 6 and 13. The impeller hub 6 is formed with an inclined drain passage 19 extending radially outwards from the space between the sealing gland 18 and the bearing 14 to permit the escape of any water which leaks through the gland 18. The appearance of any such water at the outlet end of the passage 19 gives a witness of impending failure of the gland 18.

Filling of the coupling is effected through a radial filling tube 21, the required degree of filling of the coupling being obtained by positioning the impeller casing 3 with the filling tube 21 at a predetermined angle to the vertical and filling the coupling with water up to the neck of the filling tube 21. The neck of the filling tube 21 is then closed by a plug 22 and sealing washer 23.

The threaded part of the plug 22 has an axial passage 24. At the outer end of the passage 24 is formed a seating 25 for a bursting disc 26 of high-purity nickel. The peripheral portion of the bursting disc 26 is retained against the seating 25 by a ring 27 held in place by a threaded retaining ring 28 screwed into the head of the plug 22. The retaining ring 28 is formed with a number of holes 29 serving both for engagement by a suitable tool for tightening the retaining ring 28 and to allow the rapid escape of the working liquid on rupture of the bursting disc. This construction of the retaining ring 28 also serves to prevent accidental damage to the bursting disc 26.

Diametrically opposite the filling tube 21 is a steel counter weight 31 welded to the portion 3b of the casing 3. The counter weight counterbalances the filling tube assembly and has a radially extending bore 32 connected with the working circuit by a drilled passage 37. The bore 32 is screw threaded and into it is screwed a fusible plug assembly 33 having a large-bore passageway 34 closed by a slug 35 of low melting point alloy. A sealing washer 36 is located between the fusible plug assembly 33 and the counter weight 31.

The alloy of which the slug 35 is formed is chosen in relation to the properties of the bursting disc 26 with a view to ensuring that the slug 35 melts before the bursting pressure of the bursting disc 26 is attained. Thus if the coupling is overloaded, the water filling will be ejected through the passage 34 in the fusible plug 33.

If however the fusible plug 33 is tampered with for example instead of being replaced on melting of the slug 35 the passage 34 is blocked for example by a bolt or a piece of wood hammered into it and the coupling is again overloaded, the temperature within the coupling will rise and with it the pressure until the bursting disc 26 is ruptured. The operator of the equipment, although provided with a number of spare fusible plugs, will not be provided with spare bursting discs and will not be provided with the special tool necessary for removing the bursting disc retaining the ring 28. The operator will therefore have to report the matter to his superior and the misuse of the coupling by the operator will thus become apparent.

If the operator should contrive to tamper with the bursting disc assembly, for example by blocking the holes 29 and the coupling is again overloaded, the gland 18 will ultimately fail before a dangerous pressure is attained inside the coupling. The coupling can then only be made usable by dismantling it and replacing the gland 18 with new parts. This cannot be done by the operator so that the misuse of the coupling will again be apparent.

Where the exterior of the coupling casing is forcibly air-cooled, as shown for example in British Patent No. 748,679, the fusible plug must be mounted well away from the external surface of the coupling, being usually located at the radially inner end of a discharge tube discharging at the coupling periphery.

The bursting disc can still, of course, be mounted in the outer surface of the coupling where it provides further protection in the case where a single machine, such as a long conveyor-belt, is driven by several 3-phase electric motors each driving the machine through a separate coupling. There is a risk that the supply connections for one motor may be made to the wrong terminals so that the motor rotates in the wrong direction.

The two halves of its associated coupling then rotate in opposite directions with rapid heating of the working liquid. Although the fusible plug will melt, there will be little or no vortex flow within the coupling in the direction to enter the discharge tube. Further heating and pressure rise will then occur until the bursting disc ruptures. The working liquid can then escape under the action of the centrifugal head within the impeller casing.

I claim:

1. A hydraulic turbo-coupling of the traction type, having a constant filling of working liquid having a vapour pressure which increases significantly with increasing working temperature, said coupling comprising:
    coaxially vaned impeller and runner elements defining a toroidal working circuit for said liquid, one of said impeller and liquid elements having an outlet extending from said working circuit to the exterior of the coupling;
    a bursting disc rupturably closing said outlet, said bursting disc being arranged to rupture when the internal pressure in said working circuit exceeds a predetermined value, thereby to discharge said working liquid from the coupling; and
    a sealing gland sealing said impeller and runner elements against escape of working liquid on relative rotation of said impeller and runner elements during normal operation of the coupling, said sealing gland being adapted to discharge said working liquid at a pressure close to but above said predetermined pressure at which said bursting disc ruptures.

2. A hydraulic turbo-coupling of the traction type, having a constant filling of working liquid having a vapour pressure which increases significantly with increasing working temperature, said coupling comprising:
    coaxially vaned impeller and runner elements defining a toroidal working circuit for said liquid, one of said impeller and liquid elements having an outlet extending from said working circuit to the exterior of the coupling;
    a bursting disc rupturably closing said outlet, said bursting disc being arranged to rupture when the internal pressure in said working circuit exceeds a predetermined value, thereby to discharge said working liquid from the coupling; and
    a further outlet from said working circuit to the exterior of the coupling, said further outlet being closed by a fusible plug adapted to melt at a temperature close to the temperature of said working liquid at which the vapour pressure of said working liquid causes the bursting disc to rupture.

3. A coupling according to claim 2, and further comprising a sealing gland sealing said impeller and runner elements against escape of working liquid on relative rotation of said impeller and runner elements during normal operation of the coupling, said sealing gland being adapted to discharge said working liquid at a pressure close to but above the pressures at which said sealing gland and said fusible plugs are adapted to yield and melt respectively.

References Cited

UNITED STATES PATENTS 2,301,225 11/1942 Muller.
2,983,102 5/1961 Sinclair _____ 60—54
3,008,688 11/1961 Makowski _____ 253—59

EDGAR W. GEOGHEGAN, *Primary Examiner.*